UNITED STATES PATENT OFFICE.

ROD A. DEMME, OF NEW YORK, N. Y.

CARBON AND METHOD OF PRODUCING THE SAME.

1,249,041.     Specification of Letters Patent.     Patented Dec. 4, 1917.

No Drawing.     Application filed August 29, 1917. Serial No. 188,719.

*To all whom it may concern:*

Be it known that I, Rod A. Demme, a citizen of the Republic of Switzerland, residing at New York City, in the county of New York, State of New York, have invented certain new and useful Improvements in Carbons and Methods of Producing the Same; and I do hereby declare the following to be a full, clear, and exact description of the invention, such as will enable others skilled in the art to which it appertains to make and use the same.

My invention relates to an improved form of carbon and to a method of producing the same.

In the manufacture of ethyl or grain alcohol from wood waste, and from other cellulosic raw materials, the wood material is digested with a mineral acid, usually sulfuric acid, at an elevated temperature, with the result that the wood is hydrolyzed and a large amount of sugar formed. These sugars are in part fermentable and in part unfermentable. The soluble sugars, along with other soluble substances, produced or set free during digestion, are separated from the wood which is thus left in a softened and thoroughly moistened condition and substantially freed from soluble constituents. The solution which is separated from the wood residue is subjected to fermentation for the production of alcohol. The production of alcohol in this way is an established industry, as is well known.

The wood residue, after the separation of the solution of sugars and other soluble substances therefrom, is in a form particularly adapted for the production of carbon having improved properties. It is freed from soluble constituents including those produced and set free during the hydrolysis with acid. It has been thoroughly moistened by the digestion at an elevated temperature, and its structure has been otherwise modified in a manner which further adapts it for use according to the present invention.

This hydrolyzed wood waste, freed from soluble constituents, is, according to the present invention, subjected to a carbonizing treatment by heating it gradually and progressively and under regulated conditions to a sufficiently high temperature, for example, 800° C., or higher. The material will usually be in a sufficiently comminuted condition so that further subdivision will not be necessary, inasmuch as the wood waste is usually ground to a more or less fine state before the hydrolyzing treatment. When this material is gradually and progressively heated for the purpose of carbonizing it, the moisture and other volatile components are gradually and progressively removed so that the material is given a porous structure, due to the escape of steam and other vapors and gases. As the material loses its moisture and other gaseous or vaporous components, it is converted into a more rigid, as well as a porous, structure, so that, at the end of the carbonization, the material will be left in a highly porous condition.

Inasmuch as the soluble constituents were removed from the wood waste before carbonization, the substances thus removed are no longer present to prejudice the carbonizing operation or to require their subsequent removal or decomposition during the carbonizing. Because of their removal, the remaining wood material, freed therefrom, and of modified structure and character, gives a carbonized product of high purity and of improved properties.

The improved carbonized product thus produced is available for use for different purposes. When properly prepared it is valuable because of its gas-absorbing properties or because of its decolorizing properties.

The decolorizing properties of the carbonized product may be improved by incorporating with the wood waste prior to the carbonization a mineral material such as finely ground calcium carbonate or limestone which will serve to form a skeleton support for the carbonized particles, and which will furnish carbon dioxid during the heating. This carbon dioxid has a further cleaning effect in removing volatile or vaporous components which would otherwise tend to be held within the pores of the product.

In order to promote the gas-absorbing properties of the carbonized product, it may be admixed or combined with materials such as acetates, or starch, or sugar, in solution or in a hydrated condition. Such added materials will themselves be decomposed during the carbonization and the removal of moisture or other volatile and vaporous components therefrom will further promote the production of a carbonized product of improved properties.

The properties of the carbonized product may be further improved or modified by combining or admixing with the hydrolyzed wood waste materials such as peat, or corn-cobs, or cocoanut husks, in a finely ground or comminuted state, so that the product is a composite carbonized product.

In the carrying out of the carbonization process, the mass is gradually and progressively heated under conditions permitting free escape of water vapors and gases or other vapors produced during the heating. Until the water which is thoroughly distributed throughout the hydrated wood waste has been substantially removed, the temperature of the mass will tend to remain at about the temperature of vaporization of water, and the steam formed will render the mass porous during its escape, while the porous structure thus produced will be further promoted and maintained by the modification which takes place in the hydrated wood material itself as the removal of water and other gases and vapors takes place. The temperature should be gradually and progressively increased under regulated conditions until the desired carbonization has taken place, the temperature usually being raised to around 800° C., or above, after which the material is properly cooled under conditions which prevent excess of air or injurious oxidation.

The new product obtained as the result of the carbonizing process has an improved structure and improved properties, as above pointed out, so that it forms a valuable material for use in absorbing gases, as in gas masks, or for use as a decolorizing carbon, as well as for other purposes where a highly porous and valuable form of carbonized product is desired.

It will be evident that the carbonized product may be further ground or subdivided, where this is desired, particularly if the material has had a tendency to cake together during the carbonizing treatment. This caking together may, however, in itself be highly advantageous in that it provides a product of increased uniformity in its properties and of improved porosity.

Where a decomposable inorganic material such as limestone is used, the residual lime should be removed from the carbonized product, after it has subserved its intended purpose during the process in order that it may not remain, in the carbonized product, in case the product is to be used for purposes where such residual lime would be prejudicial. This removal may be effected, for example, by leaching with dilute acids in which the lime is soluble.

I claim:—

1. The method of producing a carbonized product of improved properties, which comprises subjecting hydrolyzed cellulosic material, substantially freed from soluble constituents, to a gradual and progressive heating to a carbonizing temperature; substantially as described.

2. The method of producing a carbonized product of improved properties, which comprises subjecting finely divided wood waste to digestion with a dilute acid, removing from the digestion product the soluble constituents, and subjecting the hydrolyzed wood residue to a gradual and progressive heating up to a carbonizing temperature; substantially as described.

3. The method of producing a carbonized product of improved properties, which comprises subjecting hydrolyzed wood waste, substantially freed from soluble constituents and in admixture with a mineral substance decomposable by heat with liberation of gas, to a gradual and progressive heating to a carbonizing temperature; substantially as described.

4. The method of producing a carbonized product of improved properties, which comprises subjecting hydrolyzed wood waste, substantially freed from soluble constituents and in admixture with an organic substance decomposable by heat with liberation of gases, to a gradual and progressive heating to a carbonizing temperature; substantially as described.

5. The method of producing a carbonized product of improved properties, which comprises subjecting hydrolyzed wood waste, substantially freed from soluble constituents and in admixture with inorganic materials and with organic substances decomposable by heating with evolution of gaseous components, to a gradual and progressive heating to a carbonizing temperature; substantially as described.

6. The method of producing a carbonized product of improved properties, which comprises subjecting hydrolyzed wood waste, in intimate admixture with other carbonizable organic materials to a gradual and progressive heating to a carbonizing temperature; substantially as described.

7. The method of producing a carbonized product of improved properties, which comprises subjecting hydrolyzed wood waste, in intimate admixture with peat to a gradual and progressive heating to a carbonizing temperature; substantially as described.

8. As a new article of manufacture, a carbonized product of improved properties resulting from the carbonization of hydrolyzed cellulosic material intimately combined with other carbonized organic substances produced simultaneously therewith.

In testimony whereof I affix my signature.

ROD A. DEMME.

Copies of this patent may be obtained for five cents each, by addressing the "Commissioner of Patents, Washington, D. C."